United States Patent [19]

Kelly

[11] Patent Number: 4,507,800

[45] Date of Patent: Mar. 26, 1985

[54] ENCLOSED MAGNET LOUDSPEAKER

[75] Inventor: Michael L. Kelly, Boston, Mass.

[73] Assignee: Analog & Digital Systems, Inc., Wilmington, Mass.

[21] Appl. No.: 337,368

[22] Filed: Jan. 6, 1982

[51] Int. Cl.3 .............................................. H04M 1/04

[52] U.S. Cl. ............................ 381/88; 179/115.5 PC; 179/146 E; 179/179

[58] Field of Search ............... 179/115.5 ES, 115.5 R, 179/120, 179, 184, 115.5 PC; 381/87, 88

[56] References Cited

U.S. PATENT DOCUMENTS

| | | | |
|---|---|---|---|
| 3,230,319 | 1/1966 | Kliewer | 179/179 |
| 3,356,796 | 12/1967 | Wray | 179/179 |
| 3,614,335 | 10/1971 | Edgware | 179/115.5 R |
| 3,851,118 | 11/1974 | Kleis | 179/115.5 PC |
| 4,163,875 | 8/1979 | Cogan | 179/179 |
| 4,295,009 | 10/1981 | Weidler | 179/179 |

*Primary Examiner*—Gene Z. Rubinson
*Assistant Examiner*—L. C. Schroeder
*Attorney, Agent, or Firm*—Cushman, Darby & Cushman

[57] ABSTRACT

A loudspeaker in which a permanent magnet and associated yoke are encapsulated in a plastic housing. The voice coil and diaphragm are cemented to the top piece of the yoke to fix the position of the voice coil within the air gap defined by the yoke. The housing includes a quick bayonet type locking mechanism for locking the housing to a mounting plate, a circumferential groove which provides a receptacle for the loudspeaker grill, and a conduit through which conductors can pass to provide an electrical signal to the voice coil. The electrical signals are conducted through the housing by spring contacts which are biased against the conductive portion of a printed circuit board associated with the mounting plate to provide for a quick, sure electrical connection simultaneously with the mechanical connection.

22 Claims, 7 Drawing Figures

ENCLOSED MAGNET LOUDSPEAKER

BACKGROUND OF THE INVENTION

1. Field of the Invention

The present invention relates to loudspeakers. More specifically, the present invention relates to those loudspeakers with magnets enclosed in a housing.

2. Description of the Prior Art

Loudspeakers have always been unattractive, cumbersome affairs which have been susceptible to damage. Typically a loudspeaker includes a permanent magnet for generating a magnetic field, and a yoke consisting of pole and plate pieces for focusing the magnetic field to an air gap in which the field is particularly intensified. A voice coil is suspended in the air gap so as to be able to vibrate. A current is passed through the voice coil and the interaction of the magnetic field created by the current and the magnetic field from the permanent magnet causes the voice coil to vibrate. Attached to the voice coil is a diaphragm which has a large surface area to cause air in the vicinity of the diaphragm to vibrate, thus creating sound.

It is important that the voice coil be disposed in the center of the air gap and not touch the yoke so that the voice coil can vibrate freely. Accordingly, it is important that the relative positions of the pole pieces be rigidly fixed.

Typically, plate pieces have been glued or cemented to the permanent magnet. In this manner, the width of the air gap is rigidly set. However, problems exist with this arrangement. Typically, the permanent magnet is made of a material which chips easily. While the loudspeaker is being assembled and during use of the loudspeaker, it is easy for the permanent magnet to become chipped. Also, the glue cementing the plate pieces to the permanent magnet has been known to form an inadequate bond so that the yoke separates from the magnet.

To overcome these problems, the permanent magnet and yoke have been enclosed or encapsulated in plastic or the like. Encapsulation economically fixes the position of the yoke and permanent magnet in a manner that is aesthetically pleasing. Furthermore, enclosure or encapsulation prevents the permanent magnet from being chipped.

Typically, a non-magnetic rigid mounting plate is bolted to the enclosed magnet assembly. The diaphragm and the voice coil are attached to and suspended from the plate. Electrical leads from the voice coil are attached to terminals on the plate, to form a complete loudspeaker. The loudspeaker is then mounted to an enclosure forming a portion of a loudspeaker system.

Although such construction does reduce the structure necessary to position the yoke and the permanent magnet, the remainder of the structure tends to be bulky due to the necessity of the mounting plate. The mounting plate also detracts from the attractiveness of the loudspeaker package. Since the voice coil must be centered within the air gap, the operation of bolting the mounting plate to the enclosed assembly becomes critical, and thus time consuming and expensive.

SUMMARY OF THE INVENTION

The present invention overcomes the problems identified above by providing an enclosed magnet loudspeaker which provides for quick, simple and inexpensive mechanical and electrical connections while eliminating the necessity of a mounting plate. In addition, the enclosure is a free standing finished unit eliminating the need for a cabinet and providing a simple means for attaching the loudspeaker grill covering the diaphragm.

In the present invention, the permanent magnet and yoke are enclosed in a housing. The voice coil and diaphragm are attached to a top plate of the assembly so as to be able to vibrate freely. A groove extends circumferentially about the housing and performs three functions. First, the groove provides a receptacle for holding the grill which covers the diaphragm. Second, it provides a conduit through which electrical leads are passed to enable quick electrical connection on the opposite side of the housing from the voice coil. Third, the groove enables quick mechanical connection to a mounting plate.

To perform these three functions, the groove has a plurality of first portions extending from the side of the housing with the diaphragm into the housing a first distance. The grill is disposed in this first portion of the groove. The groove also has a plurality of second portions which extend from the side of the housing with the diaphragm toward the opposite side a second distance, which is greater than the first distance but less than the total thickness of the housing. The second portions cooperate with third portions of the groove which extend all the way through the housing to form a receptacle for bayonets attached to mounting plate. Finally, two additional portions of the groove extend all the way through the housing from the first side to the second side. In these portions, conductive spring contacts are provided which are held in position within the housing. The leads from the voice coil are attached to one end of the contacts. The other ends of the spring contacts extend below the housing and mechanically contact electrically conductive areas of a printed circuit board to which wires can be attached to direct the electrical signal to the loudspeaker.

A mounting plate has bayonets for quick mounting to the grooves of the housing as described above. The mounting plate also positions the printed circuit board with respect to the spring contacts.

The housing for the magnet/pole piece assembly thus serves as the housing for the entire loudspeaker, eliminating the necessity of any external housing and/or mounting plate. The employment of a bayonet mounting system which interacts with portions of the groove in the housing enable quick mechanical mounting of the loudspeaker. The use of spring contacts which mechanically engage the conductive portions of a printed circuit board enable quick and sure electrical connections. The elimination of the screw connection of the mounting plates, diaphragm and voice coil magnet assembly greatly simplifies assembly and alignment of the voice coil. With the present invention, a mounting plate no longer plays any role in the alignment of the voice coil. Attachment of the diaphragm, spring contacts, and grill to the housing results in a finished, free standing loudspeaker.

Alternatively, other integral type mounting systems may be employed for directly connecting the housing to the mounting plate, eliminating the necessity of separate mounting hardware (bolts or the like) found in conventional loudspeakers. Likewise, other mechanical contact type connections can be employed to accomplish the quick electrical connect function.

Thus, the present invention is very simple and inexpensive to assemble, and the size of the loudspeaker is minimized.

BRIEF DESCRIPTION OF THE DRAWING

These and other objects and advantages of the present invention will become more apparent and more readily appreciated from the following detailed description of the presently preferred exemplary embodiments of the invention taken in conjunction with the accompanying drawing, of which.

DETAILED DESCRIPTION OF THE PRESENTLY PREFERRED EMBODIMENTS

Figure 1:
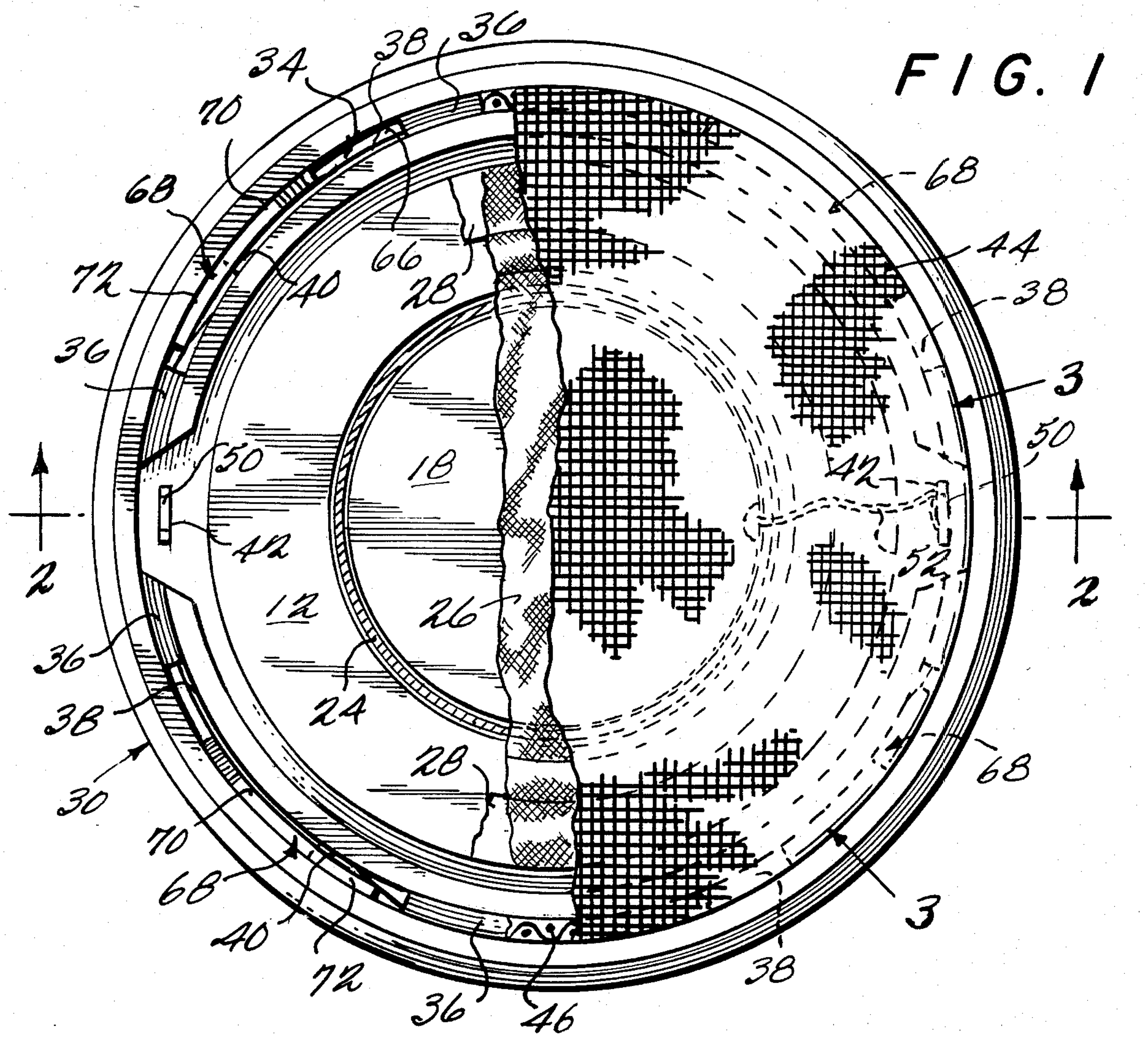
FIG. 1 is a top plan view of a first embodiment of the present invention with parts broken away.

FIG. 1 shows a top plan view of one embodiment of the present invention with parts broken away. No information is lost by breaking the Figure away, since the embodiment illustrated in FIGS. 1-4 is perfectly symmetrical about a plane perpendicular to the 2—2 line in FIG. 1.

Figure 2:
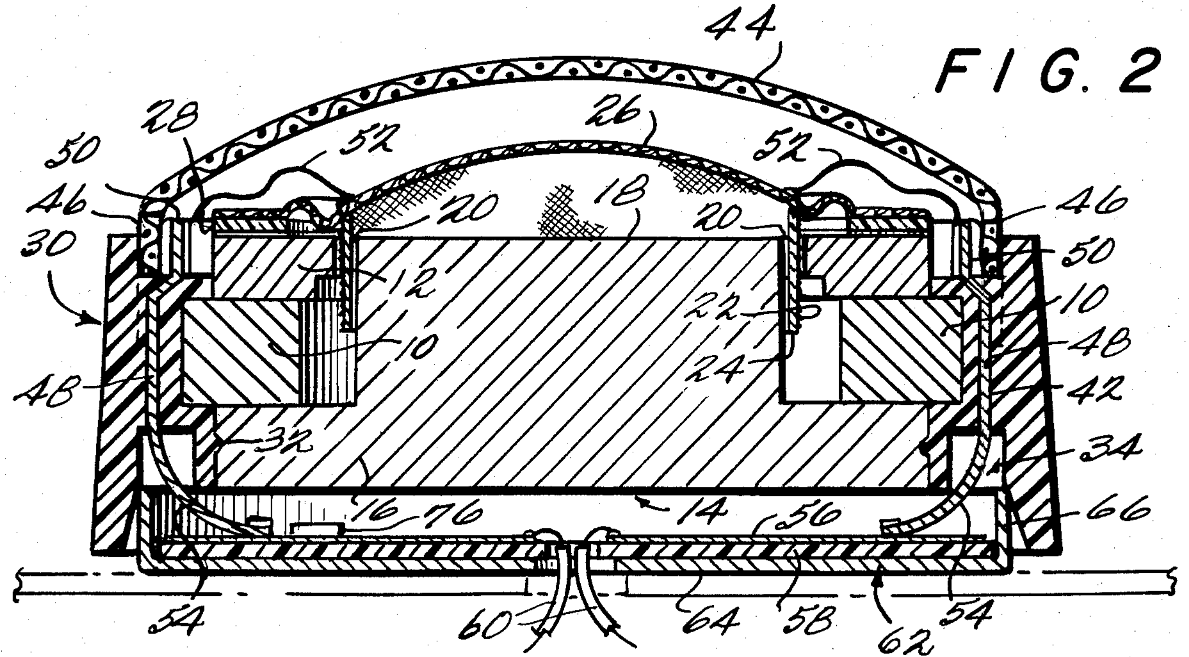
FIG. 2 is a vertical sectional view of the first embodiment taken along the 2—2 line of FIG. 1.

As best illustrated in FIG. 2, permanent magnet 10 is in the form of a ring with a first pole on the upper surface of the ring and a second pole on the lower surface of the ring. In the preferred embodiment, magnet 10 is made of samarium cobalt, although any standard ferromagnetic material such as barium ferrite can be employed. Disposed proximate the top surface of magnet 10 is magnet top plate 12. Like magnet 10, top plate 12 is a ring, and in the preferred embodiment, is made of steel. Disposed proximate the opposite surface of magnet 10 is back plate/pole piece assembly 14 which includes back plate 16 in the form of a disk on which pole piece 18 is mounted in the form of a cylinder. Back plate 16 and pole piece 18 may be formed integrally, may be bolted together, or may be interconnected in any manner well known in the art. In the preferred embodiment, assembly 14 is made of steel. Pole piece 18 and top plate 12 form an induction air gap 20 therebetween.

Disposed in air gap 20 is voice coil 22 mounted on non-magnetic cylinder 24. In the preferred embodiment, cylinder 24 is aluminum.

Attached to one end of cylinder 24 is diaphragm 26. The material of diaphragm 26 extends beyond cylinder 24 to form a flexible connection with gasket 28. In the preferred embodiment, diaphragm 26 is a formed and sealed nylon weave and gasket 28 is phenolic. Gasket 28 is glued to the top surface of top plate 12.

Enclosing permanent magnet 10, top plate 12 and assembly 14 is insulative housing 30. In the preferred embodiment, housing 30 is plastic and is molded about and encapsulates magnet 10, top plate 12 and assembly 14. Either top plate 12 or assembly 14 may include a depression or a ridge such as depression 32 to insure that top plate 12 or assembly 14 is securely held by housing 30. Alternatively, an adhesive may be employed between housing 30 and the magnetic elements.

Housing 30 includes a groove 34 extending about at least a portion of the circumference of housing 30 inward of the periphery of housing 30. Groove 34 includes a number of different portions of varying depth. Thus, portions 36 extend inwardly from the side of housing 30 closest to diaphragm 26 a first, rather small distance. Portions 38 extend all the way through housing 30. Portions 40 extend inwardly from the surface of housing 30 nearest diaphragm 26 a second distance, which is greater than the first distance but less than the entire thickness of housing 30. Finally, portions 42 also extend through the entire thickness of housing 30.

Portions 36 of groove 34 enable housing 30 to perform the first function attributable to it—receiving grill 44. Thus, grill 44 has portions 46 which are received by groove 34 down to the first distance as limited by groove portions 36. In the preferred embodiment, grill 44 is an open mesh. The frictional engagement of portions 46 with housing 30 eliminates the necessity of additional attachment between grill 44 and housing 30.

The second function of groove 34 is to provide conduits for conductors directing an electrical signal to the voice coil. Portions 42 of groove 34 provide this conduit. Conductive spring contacts 48 are located in portions 42. In the embodiment illustrated in FIGS. 1-3, spring contacts 48 are molded into housing 30 as housing 30 is formed.

Figure 3:
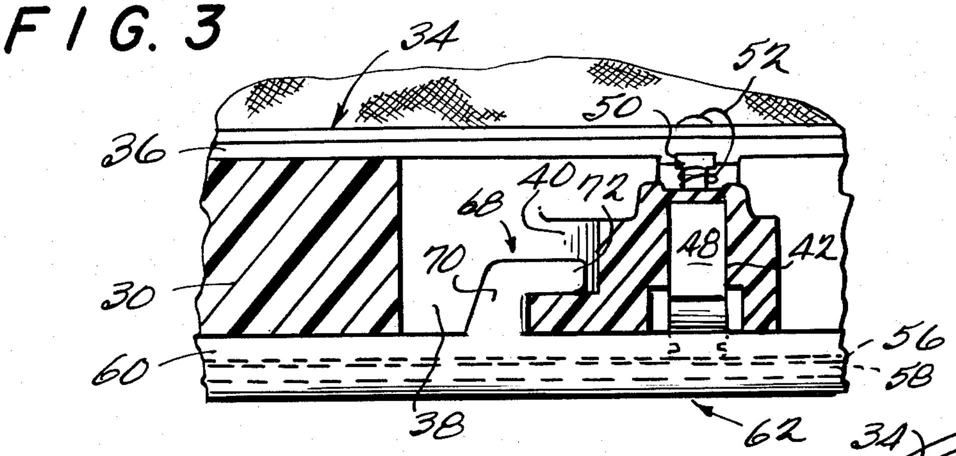
FIG. 3 is a vertical sectional view of the first embodiment taken along the 3—3 line of FIG. 1 with parts omitted for clarity.

As illustrated in FIG. 3, spring contacts 48 have a terminal 50. As illustrated in FIGS. 1-3, a lead 52 from voice coil 22 is attached to each terminal 50. As best illustrated in FIG. 2, spring contacts 48 have curved portions 54 which extend below assembly 14.

Curved portions 54 engage conductive regions 56 of printed circuit board 58. In fact, the springiness of curved portions 54 provide a sufficent force so that spring contacts 48 make good electrical contact with conductive regions 56. Leads 60 are connected to conductive areas 56 so that electrical signals on leads 60 may be supplied to voice coil 22.

Figure 4:
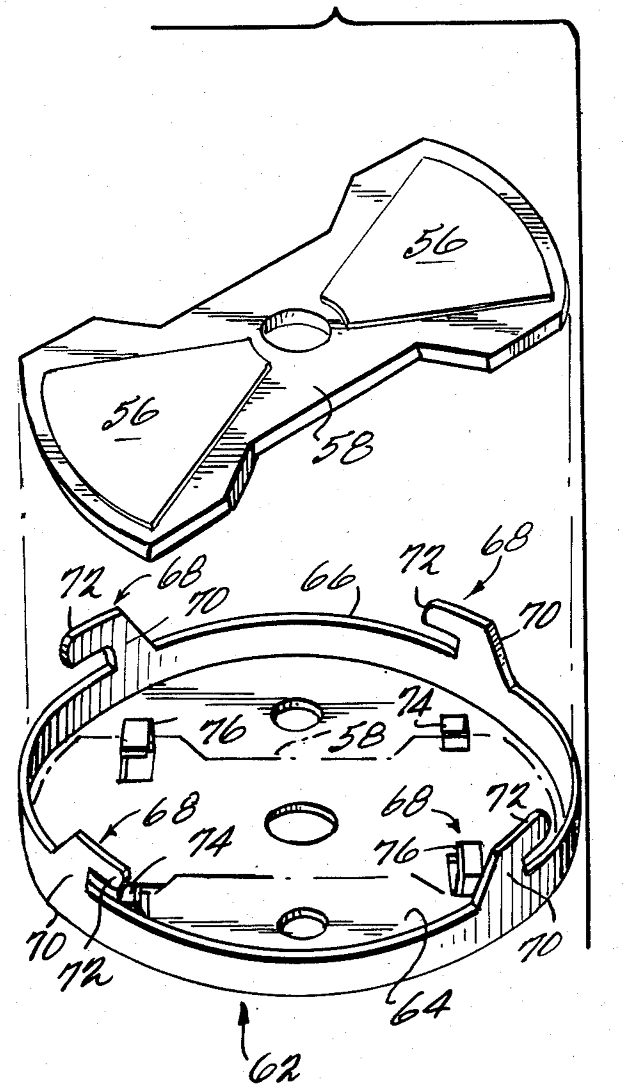
FIG. 4 is an exploded perspective view of the printed circuit board and mounting plate of the present invention.

The final function of groove 34 in housing 30 is to enable quick mechanical connection to a mounting plate. Thus, as illustrated in FIGS. 2-4, mounting plate 62 includes a base 64 and a circumferential vertical wall 66. Disposed on vertical wall 66 are four bayonets 68. Each bayonet 68 includes a vertical member 70 and a horizontal member 72. The circumferential length of bayonets 68 (the combined circumferential length of vertical member 70 and horizontal member 72) is less than the circumferential length of groove portion 38. Bayonets 68 are aligned with groove portions 38 so that bayonets 68 can enter groove portions 38. Housing 30 may then be twisted so that horizontal portions 72 enter groove portions 40 to lock housing 30 to mounting plate 62. To further ensure a good mechanical connection, groove portions 40 are tapered so as to squeeze horizontal bayonet portions 72.

Mounting plate 62 also positions printed circuit board 58. Thus, stops 74 and clips 76 are formed in base 64 by stamping. Stops 74 have a height no greater than the thickness of printed circuit board 58. On the other hand, circuit board 58 may slide under clips 76. The open end of each clip 76 faces a stop 74. The orientation of one stop 74 and facing clip 76 is opposite that of the other so that stops 74 are diagonally opposite each other and clips 76 are diagonally opposite each other.

For positioning, printed circuit board 58 is laid over stops 74. Then, printed circuit board 58 is rotated so that the leading edges slip under clips 76. The distance between each stop 74 and the opposite clip 76 is determined so that just as printed circuit board 58 is rotated to the greatest extent possible under clips 76, the trailing edges of printed circuit board 58 drop off of stops 74 to be flushed with base 64 as illustrated in phantom line in FIG. 4. In this manner, printed circuit board 58 is locked in position on mounting plate 62.

As is well known to those skilled in the art, it is necessary that loudspeakers be connected in proper phase. That is, the same terminal of the voice coil on all of the speakers must be supplied with a similarly phased signal.

In the embodiment illustrated in FIGS. 1-4, spring contacts 48 lie along the same diameter of housing 30. Therefore, when housing 30 is locked to mounting plate 62, care must be taken to insure proper phasing for the loudspeaker. Alternatively, spring contacts 48 may be disposed along different diameters. Also, the positions of conductive portions 56 on printed circuit board 58 may be adjusted so that the spring contacts 48 rest on conductive portions 56 only when an in phase signal will be applied to the loudspeaker.

In the embodiment in FIGS. 1-4, spring contacts 48 are molded directly into housing 30. This arrangement is advantageous in that it reduces the amount of assembly necessary after molding. Well known mechanical devices may be used for positioning spring contacts 48 during the molding process.

Figure 5:
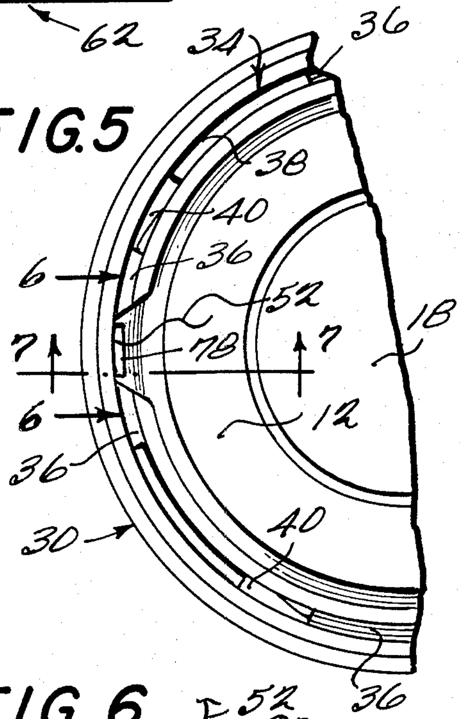
FIG. 5 is a fragmentary top plan view of a second embodiment of the present invention.
Figure 6:
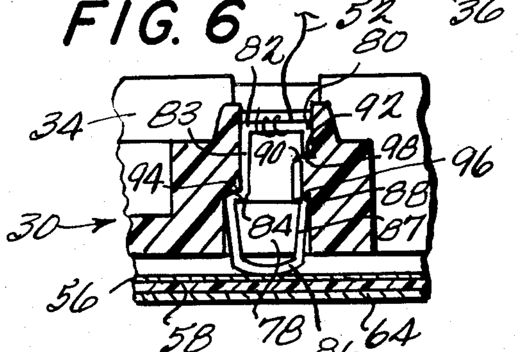
FIG. 6 is a sectional view of the second embodiment of the present invention taken along the 6—6 line of FIG. 5.
Figure 7:
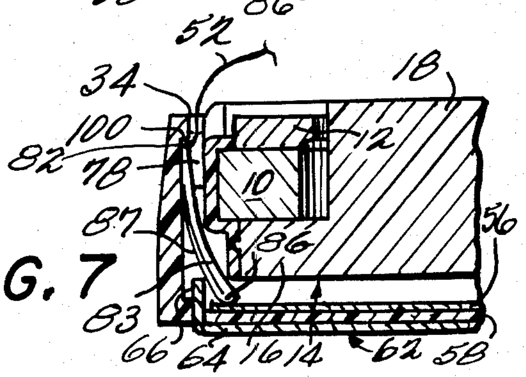
FIG. 7 is a sectional view of the second embodiment of the present invention taken along the 7—7 line of FIG. 5.

Nevertheless, it may be more desirable in some circumstances to simplify the molding process by eliminating the necessity of molding spring contacts 48 into the housing. FIGS. 5-7 illustrate an alternative embodiment in which the spring contacts are not molded into housing 30, but mechanically inserted after molding. In FIGS. 5-7, like parts have been assigned the same reference numerals as in FIGS. 1-4 and no additional description will be provided.

FIG. 5 is an illustration of only top plate 12, assembly 14 and housing 30 for clarity. In this embodiment, instead of grooves 42, larger grooves 78 are provided. Modified spring contacts 80 are designed to slip into groove portions 78. Thus, as illustrated in FIG. 6, modified spring contact 80 begins at a first end 92 which extends to an upper portion 82 to which voice coil lead 52 is soldered. Spring wire 80 includes a side 83 which extends away from portion 82 and has a shoulder 84 therein. Continuing around spring wire 80, a curved portion 86 follows side 83 which is designed to contact a conductive portion 56 of printed circuit board 58. Curved portion 86 is followed by side 87 which includes a second shoulder 88. Spring wire 80 finishes at a second end 90.

With this configuration, spring wire 80 is designed to lock into groove portion 78. Thus, groove portion 78 has a first shoulder 94, a second shoulder 96, and a third shoulder 98. When spring wire 80 is slipped into groove portion 78, shoulders 84 and 88 of spring wire 80 slip under shoulders 94 and 96 of groove portion 78 so as to prevent spring wire 80 from coming back out the top of housing 30. Also, end 92 of spring wire 80 comes to rest on shoulder 98 of groove portion 78 so as to prevent spring wire 80 from slipping out the bottom of housing 30.

As illustrated in FIG. 7, in order to more exactly position spring wire 80 within groove portion 78, shoulder 100 is provided in housing 30 under which portion 82 of spring wire 80 slips as spring wire 80 locks into position. Furthermore, side 83 is not parallel to side 87. Thus, side 83 is bent to follow the inner side of groove portion 78, while side 87 follows more closely the outer side of groove portion 78.

Although only a few exemplary embodiments of this invention have been described in detail above, those skilled in the art would readily appreciate that many modifications are possible in the exemplary embodiments without materially departing from the novel teachings and advantages of this invention.

For example, the bayonet mechanical connect system may be replaced by any other quick connect system. Thus pins may be formed with the housing which expands after passing through a hole in the mounting plate. Likewise, any other quick electrical connection system may be employed. Thus the spring contacts may include portions biased against a fixed surface (e.g., the housing) which enables direct connection of leads to the spring contacts, eliminating the printed circuit board.

Accordingly, all such modifications are intended to be included within the scope of this application as defined in the following claims.

What is claimed is:

1. A loudspeaker comprising:

means for creating vibrations in response to an electrical signal;

a housing attached to and encapsulating at least a portion of said creating means, said housing having a plurality of first grooves extending circumferentially about said housing and axially a first predetermined distance into said housing and a plurality of second grooves, one associated with and contiguous to each of said first grooves and extending circumferentially about said housing, coaxially with said first grooves, said second grooves beginning a second predetermined distance, less than said first predetermined distance, into said housing and extending to said first predetermined distance; and a mounting plate, said mounting plate including a plurality of vertical members extending into said first grooves and a plurality of horizontal members, each attached to one of said vertical members and extending into said second grooves, each combination of said horizontal and vertical member having a circumferential length less than the circumferential length of said first groove so that said housing may be separated from said mounting plate by rotating said housing and moving said housing normal to said mounting plate.

2. A loudspeaker comprising:

means for creating vibrations in response to an electrical signal;

a housing attached to said creating means and having first and second grooves completely surrounded by and extending through said housing in a direction substantially parallel to the direction of vibrations from said creating means;

first and second spring means for conducting said electrical signal to and from said creating means through said housing, said first and second spring means being disposed in said housing first and second grooves, respectively; and connecting means for conducting said electrical signal to said spring means, said connecting means including first and second terminal means for receiving said electrical signal, said first and second terminal means mechanically contacting said first and second spring means, respectively, to complete an electrical circuit including said first terminal means, said first spring means, said creating means, said second spring means and said second terminal means.

3. A loudspeaker comprising:

means for creating vibrations in response to an electrical signal;

a housing attached to said creating means and having first and second grooves completely surrounded by and extending through said housing from a first side to a second side in a direction substantially parallel to the direction of vibrations from said creating means;

first and second spring means for conducting said electrical signal to and from said creating means through said housing, one of said first and second spring means being disposed in each of said first and second grooves, respectively;

connecting means for conducting said electrical signal to said spring means, said connecting means including first and second terminal means for receiving said electrical signal, said first and second terminal means mechanically contacting said first and second spring means, respectively, to complete an electrical circuit including said first terminal means, said first spring means, said creating means, said second spring means and said second terminal means; and a mounting plate, said housing and said mounting plate integrally including means for directly interconnecting said housing and said mounting plate without interconnecting elements separable from said housing and mounting plate.

4. A loudspeaker comprising:

means for creating vibrations in response to an electrical signal;

a housing attached to said creating means, said housing having a first side, a second side opposite said first side and a groove extending about at least a portion of the circumference of said housing inward of the periphery of said housing, said groove having two first portions extending through said housing from said first side to said second side, a plurality of second portions extending a first distance into said housing from said first side and a plurality of third portions, one associated with and contiguous to each of said second portions, said third portions beginning a second distance, less than said first distance, from said first side in extending to said first distance;

first and second spring means for conducting said electrical signal to and from said creating means through said housing, one of said first and second spring means being disposed in each of said two housing groove first portions, respectively;

connecting means for conducting said electrical signal to said spring means, said connecting means including first and second terminal means for receiving said electrical signal, said first and second terminal means mechanically contacting said first and second spring means, respectively, to complete an electrical circuit including said first terminal means, said first spring means, said creating means, said second spring means and said second terminal means; and a mounting plate including means for fixing the position of said connecting means with respect to said housing, said mounting plate having a base, a plurality of vertical members extending into said housing groove second portions and a plurality of horizontal members each attached to one of said vertical members and extending into said housing groove third portions, each combination of said horizontal and vertical member having a circumferential length less than the circumferential length of said housing groove second portions so that said housing may be separated from said mounting plate by rotating said housing and moving said housing normal to said mounting plate base.

5. A loudspeaker comprising:

means for creating vibrations in response to an electrical signal;

a housing attached to said creating means having a first side, a second side opposite said first side, a first groove extending about at least a portion of the circumference of said housing inward of the periphery of said housing and second and third grooves extending through said housing from said first side to said second side;

first and second spring means for conducting said electrical signal to and from said creating means through said housing, said first and second spring means being disposed in said housing second and third grooves, respectively;

connecting means for conducting said electrical signal to said spring means, said connecting means including first and second terminal means for receiving said electrical signal, said first and second terminal means mechanically contacting said first and second spring means, respectively, to complete an electrical circuit including said first terminal means, said first spring means, said creating means, said second spring means and said second terminal means; and grill means for covering said creating means, said grill means including portions extending into said housing first groove.

6. A loudspeaker comprising:

means for creating vibrations in response to an electrical signal;

a housing attached to said creating means, said housing having a first side and a groove extending about at least a portion of the circumference of said housing inward of the periphery of said housing and extending from said first side a first distance into said housing;

grill means for covering said creating means, said grill means including a portion extending into said groove; and a mounting plate, said housing and mounting plate integrally including means for directly interconnecting said housing and said mounting plate without interconnecting elements separable from said housing and said mounting plate.

7. A loudspeaker comprising:

means for creating vibrations in response to an electrical signal;

a housing attached to said creating means and having a first side and a first groove extending about at least a portion of the circumference of said housing inward of the periphery of said housing and axially into said housing from said first side a first distance and two second grooves extending through said housing from said first side to said second side;

first and second spring means for conducting said electrical signal to and from said creating means through said housing, one of said first and second spring means being disposed in each of said two second grooves, respectively;

connecting means for conducting said electrical signal to said spring means, said connecting means including first and second terminal means for receiving said electrical signal, said first and second terminal means mechanically contacting said first and second spring means, respectively, to complete an electrical circuit including said first terminal means, said first spring means, said creating means, said second spring means and said second terminal means;

grill means for covering said creating means, said grill means including portions extending into said first groove; and a mounting plate, said housing and mounting plate integrally including means for directly interconnecting said housing and said mounting plate without interconnecting elements separable from said housing and said mounting plate.

8. A loudspeaker as in claim 1, 2, 3, 4, 5, 6 or 7 wherein said creating means further comprises:

a permanent magnet having first and second poles;

a yoke disposed contiguous with said first and second poles, respectively, said yoke defining an air gap;

a voice coil disposed in said air gap, said voice coil being responsive to said electrical signal; and vibrating means attached to said voice coil.

9. A loudspeaker as in claim 8 wherein said creating means further comprises a gasket, said gasket being attached to said vibrating means and said yoke for centering said voice coil in said air gap.

10. A loudspeaker comprising:

means for creating vibrations in response to an electrical signal;

a housing attached to said creating means, said housing having a first side, a second side opposite said first side and a groove extending about at least a portion of the circumference of said housing inward of the periphery of said housing, said groove having a plurality of first portions extending from said first side towards said second side a first distance, a plurality of second portions extending from said first side towards said second side a second distance greater than said first distance and less than the distance between said first and second sides, two third portions extending from said first side through said housing to said second side and a plurality of fourth portions extending from said first side to said second side, each of said fourth portions being disposed contiguous with one of said second portions, respectively, adjacent fourth portions being separated by one of said second portions;

grill means disposed over said creating means and extending said first distance into said groove from said first side;

first and second spring means each disposed in one of said housing groove third portions, said first and second spring means for conducting said electrical signal to and from said creating means through said housing, said housing groove third portions and said spring means including means for maintaining the position of said spring means with respect to said housing;

electrical connecting means having first and second terminal means mechanically contacting said first and second spring means, respectively; and a mounting plate including means for fixing the position of said connecting means with respect to said housing, said mounting plate having a base, a plurality of vertical members extending into said housing groove fourth portions and a plurality of horizontal members, each attached to one of said vertical members and extending into said housing groove second portions, each combination of said horizontal and vertical member having a circumferential length less than the circumferential length of said housing groove fourth portions so that said housing may be separated from said mounting plate by rotating said housing and moving said housing normal to said mounting plate base.

11. A loudspeaker comprising:

a permanent magnet having first and second poles;

a yoke disposed contiguous with said first and second poles, respectively, said yoke defining an air gap;

a voice coil disposed in said air gap, said voice coil having first and second terminals;

vibrating means attached to said voice coil;

an insulative housing attached to said permanent magnet and said yoke, said housing having a first side proximate said voice coil, a second side opposite said first side and a groove extending about at least a portion of the circumference of said housing inward of the periphery of said housing, said groove having a plurality of first portions extending from said first side toward said second side a first distance, a plurality of second portions extending from said first side toward said second side a second distance greater than said first distance and less than the distance between said first and second sides, two third portions extending from said first side through to said second side and a plurality of fourth portions extending from said first side through to said second side, each of said fourth portions being disposed contiguous with one of said second portions, respectively, adjacent fourth portions being separated by one of said second portions;

grill means for covering said vibrating means, said grill means extending said first distance into said groove from said first side;

first and second spring means each disposed in one of said housing groove third portions, said first and second spring means being connected to said first and second voice coil terminals, respectively, said housing groove third portions and said spring means including means for maintaining the position of said spring means with respect to said housing;

connecting means having first and second terminal means mechanically contacting said first and second spring means, respectively; and a mounting plate including means for fixing the position of said connecting means with respect to said housing, said mounting plate having a base, a plurality of vertical members extending into said housing groove fourth portions and a plurality of horizontal members, each attached to one of said vertical members and extending into said housing groove second portions, each combination of said horizontal and vertical member having a circumferential length less than the circumferential length of said housing groove fourth portions so that said housing may be separated from said mounting plate by rotating said housing and moving said housing normal to said mounting plate base.

12. A loudspeaker as in claim 11 further comprising a gasket attached to said vibrating means and said yoke for centering said voice coil in said air gap.

13. A loudspeaker as in claim 10 or 11 wherein said mounting plate fixing means comprises:

first and second stops disposed on said base; and first and second clips, each of said clips having an open end facing a corresponding one of said stops, said clips being arranged diagonally opposite each other and said stops being arranged diagonally opposite each other so that said connecting means may be fixed to said mounting plate by disposing said connecting means over said stops and rotating said connecting means until said connecting means slides under said first and second clips, said connecting means being disposed against said stops when said connecting means is fully inserted in said clips.

14. A loudspeaker as in claim 4, 7 or 11 wherein said connecting means is a printed circuit board and said first and second terminal means are conductive areas on said printed circuit board.

15. A loudspeaker as in claim 2, 4, 7 or 10 wherein said housing encapsulates at least a portion of said creating means.

16. A loudspeaker as in claim 11 wherein said housing encapsulates said permanent magnet and said yoke.

17. A loudspeaker as in claim 8 wherein said housing encapsulates said permanent magnet and said yoke.

18. A loudspeaker as in claim 3, 5, 10 or 11 wherein said spring means are molded into said housing.

19. A loudspeaker as in claim 3, 5, 10 or 11 wherein said spring means are removably attached to said housing.

20. A loudspeaker as in claim 19 wherein each of said first and second spring means includes shoulder means for engaging said housing to prevent said spring means from leaving said housing unless said shoulder means are released.

21. A loudspeaker as in claim 3, 6 or 7 wherein said interconnecting means includes:

a plurality of first additional grooves extending circumferentially about said housing and axially a first predetermined distance into said housing;

a plurality of second additional grooves, one associated with and contiguous to each of said first additional grooves and extending circumferentially about said housing, coaxially with said first additional grooves, said second additional grooves beginning a second predetermined distance, less than said first predetermined distance, into said housing and extending to said first predetermined distance;

a plurality of vertical members attached to said mounting plate and extending into said first additional grooves; and a plurality of horizontal members, each attached to one of said vertical members and extending into said second additional grooves, each combination of said horizontal and vertical member having a circumferential length less than the circumferential length of said first additional groove so that said housing may be separated from said mounting plate by rotating said housing and moving said housing normal to said mounting plate.

22. A loudspeaker comprising:

a permanent magnet having first and second poles;

a yoke disposed contiguous with said first and second poles, respectively, said yoke defining an air gap;

a voice coil disposed in said air gap, said voice coil being responsive to an electrical signal;

vibrating means attached to said voice coil;

a gasket, said gasket being attached to said vibrating means and said yoke for centering said voice coil in said air gap;

a housing attached to one of said yoke and said permanent magnet; and a mounting plate, said housing and mounting plate integrally including means for directly interconnecting said housing and said mounting plate without interconnecting elements separable from said housing and said mounting plate.

* * * * *